US012497266B2

(12) United States Patent
Li et al.

(10) Patent No.: US 12,497,266 B2
(45) Date of Patent: Dec. 16, 2025

(54) BRAKE DEVICE FOR ELEVATOR SYSTEM AND A TEST METHOD THEREOF

(71) Applicant: Otis Elevator Company, Farmington, CT (US)

(72) Inventors: GuoSong Li, Tianjin (CN); Hua Zhou, Tianjin (CN); Zixu Zhang, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1451 days.

(21) Appl. No.: 17/081,249

(22) Filed: Oct. 27, 2020

(65) Prior Publication Data

US 2021/0130126 A1 May 6, 2021

(30) Foreign Application Priority Data

Oct. 30, 2019 (CN) ......................... 201911043450.8

(51) Int. Cl.
*B66B 5/00* (2006.01)
*B66B 5/18* (2006.01)
*B66D 5/30* (2006.01)

(52) U.S. Cl.
CPC .............. *B66B 5/0025* (2013.01); *B66B 5/18* (2013.01); *B66D 5/30* (2013.01)

(58) Field of Classification Search
CPC ........... B66B 5/0025; B66B 5/18; B66B 1/32; B66B 5/0037; B66B 5/0093; B66D 5/30; B66D 5/06; B66D 5/24
See application file for complete search history.

(56) References Cited

U.S. PATENT DOCUMENTS 11,649,139 B2 * 5/2023 Illan .......................... B66B 5/22 187/288
2013/0043097 A1 * 2/2013 Widmer .................... B66B 5/02 187/288

(Continued)

FOREIGN PATENT DOCUMENTS

CN 107215735 A 9/2017
CN 110002308 A 7/2019

(Continued)

OTHER PUBLICATIONS

Chinese Office Action for Application No. 201911043450.8, Issued Sep. 28, 2023, 7 Pages.

(Continued)

*Primary Examiner* — Jeffrey Donels
(74) *Attorney, Agent, or Firm* — CANTOR COLBURN LLP

(57) ABSTRACT

A brake device for an elevator system and a testing method thereof. The brake device includes: a fixed member; a moving member movable between a retracted position and a braking position so as to realize switching of the moving member between an attracting state and a braking state, respectively; an elastic member to provide elastic force tending to push the moving member toward the braking position; a coil configured to produce an electromagnetic force tending to drive the moving member to move toward the retracted position when energized; and a controller configured to control a change of a magnitude of the electromagnetic force produced by the coil in a process of testing the spring force of the elastic member, and to acquire corresponding information of the electrical signal for controlling the magnitude of the electromagnetic force when the moving member switches from the attracting state to the braking state.

18 Claims, 4 Drawing Sheets

100

(56) References Cited

U.S. PATENT DOCUMENTS

| | | | | |
|---|---|---|---|---|
| 2013/0213745 | A1* | 8/2013 | Kattainen | B66B 5/0031 187/288 |
| 2017/0001832 | A1* | 1/2017 | Lindberg | B66B 1/34 |
| 2018/0134517 | A1 | 5/2018 | Zhou | |
| 2018/0362291 | A1* | 12/2018 | Studer | B66B 5/0031 |
| 2019/0315593 | A1 | 10/2019 | Rossi et al. | |
| 2020/0056666 | A1* | 2/2020 | Zhang | B66D 5/14 |
| 2020/0180906 | A1* | 6/2020 | Li | B66D 5/08 |

FOREIGN PATENT DOCUMENTS

| | | | |
|---|---|---|---|
| CN | 108341309 | B | 9/2021 |
| DE | 112012005188 | B4 | 4/2017 |
| EP | 1431226 | A1 | 6/2004 |
| JP | H10258975 | A | 9/1998 |
| KR | 200401410 | Y1 | 11/2005 |
| WO | 2006033165 | A1 | 3/2006 |

OTHER PUBLICATIONS

European Search Report for Application No. 20204636.3; Issued Apr. 7, 2021; 6 Pages.

* cited by examiner

BRAKE DEVICE FOR ELEVATOR SYSTEM AND A TEST METHOD THEREOF

FOREIGN PRIORITY

This application claims priority from Chinese patent application No. 201911043450.8, filed on Oct. 30, 2019, the entirety of which is hereby incorporated by reference herein and forms a part of the specification.

TECHNICAL FIELD OF INVENTION

The present invention relates to the field of elevator brake technique, and more specifically to a brake device for elevator system and the testing method for the brake device, and an elevator system using the brake device.

BACKGROUND OF THE INVENTION

In an elevator system, corresponding to, for example, a traction machine for powering an elevator, a respective brake device is disposed to enable a braking operation during operation of the elevator.

Generally, to ensure reliable and safe operation of the brake device, the brake device needs to be periodically tested during an elevator maintenance process, for example, the degree of wear of a friction plate in the brake device is estimated typically by manually employing a feeler gauge to test an air gap between a moving member and a fixed member in the brake device.

SUMMARY OF THE INVENTION

According to an aspect of the present disclosure, there is provided brake device for an elevator system, comprising: a fixed member; a moving member that is movable between a retracted position and a braking position so as to realize switching of the moving member between an attracting state and a braking state, respectively; an elastic member, disposed between the moving member and the fixed member, for providing a spring force tending to push the moving member toward the braking position; a coil configured to produce an electromagnetic force tending to drive the moving member to move toward the retracted position when energized; and a controller configured to control a magnitude of the electromagnetic force produced by the coil to change in a process of testing the spring force of the elastic member, and to acquire information of the corresponding electrical signal for controlling the magnitude of the electromagnetic force when the moving member switches from the attracting state to the braking state so as to evaluate the spring force being tested.

The brake device according to an embodiment of the present disclosure, wherein when the moving member is in the retracted position, the moving member is separate from the braking member and is in the attracting state in which the moving member is attracted to the fixed member, when the moving member is in the braking position, the moving member is in the braking state in which braking force is provided to the braking member through a friction plate correspondingly disposed on the moving member.

The brake device according to yet another embodiment of the present disclosure or any of the above embodiments, wherein the controller is further configured to store a first correspondence between the information of the electrical signal and the electromagnetic force produced by the coil.

The brake device according to yet another embodiment of the present disclosure or any of the above embodiments, wherein the controller is further configured to further determine a magnitude and/or a change of the spring force being tested based on the acquired information of the electrical signal and the first correspondence.

The brake device according to yet another embodiment of the present disclosure or any of the above embodiments, wherein the controller is further configured to store a second correspondence between the information of the electrical signal and the spring force of the elastic member, wherein, the second correspondence comprises a correspondence between a calibration value of a corresponding electrical signal when the moving member switches from the attracting state to the braking state obtained by testing before a performance degradation of the elastic member and an initial spring force of the elastic member, the initial spring force of the elastic member is obtained based on the first correspondence and the calibration value.

The brake device according to yet another embodiment of the present disclosure or any of the above embodiments, wherein the controller is further configured to evaluate a degree of the performance degradation of the spring force according to a comparison between the currently acquired information of the electrical signal and the calibration value.

The brake device according to yet another embodiment of the present disclosure or any of the above embodiments, wherein the electrical signal is represented as a pulse width modulation voltage signal, the information of the electrical signal including voltage magnitude information corresponding to a duty cycle of the pulse width modulation voltage signal.

The brake device according to yet another embodiment of the present disclosure or any of the above embodiments, wherein the controller is further configured to control the electromagnetic force produced by the coil to change from large to small by controlling the electrical signal to decrease over time from high to low in a range of a predetermined phase.

The brake device according to yet another embodiment of the present disclosure or any of the above embodiments, wherein the predetermined phase comprises a first sub-phase, a second sub-phase and a third sub-phase sequentially arranged in time sequence;

wherein the controller is further configured to control a decreasing speed of the electrical signal in the second sub-phase to be relatively lower than the decreasing speed in the first sub-phase and third sub-phase and to substantially ensure that the information of the corresponding electrical signal when the moving member switches from the attracting state to the braking state is acquired in the second sub-phase.

The brake device according to yet another embodiment of the present disclosure or any of the above embodiments, wherein the controller is further configured to determine whether to transmit a notification of maintenance or replacement of the elastic member based on the change of the acquired information of the electrical signal.

According to yet another aspect of the present disclosure, there is provided an elevator system, comprising: an elevator car, and a traction device driving the elevator car to travel in a hoistway; wherein the elevator system further comprises a brake device according to any of the claims 1 to 10 disposed corresponding to the braking member of the traction device.

According to yet another aspect of the present disclosure, there is provided a testing method for a brake device, comprising the steps of: controlling a magnitude of an electromagnetic force produced by a coil of the brake device when energized to change; acquiring information of a corresponding electrical signal for controlling the magnitude of the electromagnetic force when a moving member of the brake device switches from an attracting state to a braking state; and evaluating a spring force provided by an elastic member of the brake device disposed between the moving member and the fixed member based on the acquired information of the electrical signal; wherein the moving member is movable between an attracting position and a braking position so as to realize switching of the moving member between the attracting state and the braking state, respectively; the spring force provided by the elastic member tends to push the moving member toward the braking position, the electromagnetic force tends to drive the moving member to move toward the retracted position.

The testing method according to an embodiment of the present disclosure, wherein in the step of evaluating the spring force provided by the elastic member, the magnitude and/or change of the spring force being tested is determined based on the acquired information of the electrical signal and a first correspondence between the previously acquired information of the electrical signal and the electromagnetic force produced by the coil.

The testing method according to yet another embodiment of the present disclosure or any of the above embodiments, wherein the second correspondence between the information of the electrical signal and the spring force of the elastic member is obtained based on the first correspondence; wherein the second correspondence comprises the correspondence between a calibration value of the corresponding electrical signal when the moving member switches from the attracting state to the braking state obtained by testing before a performance degradation of the elastic member and an initial spring force of the elastic member, the initial spring force of the elastic member is obtained based on the first correspondence and the calibration value.

The testing method according to yet another embodiment of the present disclosure or any of the above embodiments, wherein in the step of evaluating the spring force provided by the elastic member, a degree of the performance degradation of the spring force is evaluated according to a comparison between the currently acquired information of the electrical signal and the calibration value.

The testing method according to yet another embodiment of the present disclosure or any of the above embodiments, wherein the electrical signal is represented as a pulse width modulation voltage signal, the information of the electrical signal including voltage magnitude information corresponding to a duty cycle of the pulse width modulation voltage signal.

The testing method according to yet another embodiment of the present disclosure or any of the above embodiments, wherein in the process of controlling the magnitude of the electromagnetic force produced by the coil of the brake device when energized to change, the electromagnetic force produced by the coil when energized is controlled to change from large to small by controlling the electrical signal to decrease over time from high to low in a range of a predetermined phase.

The testing method according to yet another embodiment of the present disclosure or any of the above embodiments, wherein the predetermined phase comprises a first sub-phase, a second sub-phase and a third sub-phase sequentially arranged in time sequence; wherein the method comprising controlling a decreasing speed of the electrical signal in the second sub-phase to be relatively lower than the decreasing speed in the first sub-phase and third sub-phase and substantially ensuring that the information of the corresponding electrical signal when the moving member switches from the attracting state to the braking state is acquired in the second sub-phase.

The testing method according to yet another embodiment of the present disclosure or any of the above embodiments, further comprising the steps of: determining whether to transmit a notification of maintenance or replacement of the elastic member based on the change of the acquired information of the electrical signal; and transmitting a notification of maintenance or replacement of the elastic member when determined as "yes".

The testing method according to yet another embodiment of the present disclosure or any of the above embodiments, wherein the electrical signal is a voltage signal and the information of the electrical signal comprises a voltage magnitude.

The above features and operations of the present invention will become more apparent from the following description and the accompanying drawings.

BRIEF DESCRIPTION OF THE DRAWINGS

The disclosure of the present invention will become more easily to understand with reference to the accompanying drawings. Those skilled in the art can readily understand that the drawings are for illustrative purposes only, instead of being intended to limit the protective scope of the present invention. In addition, similar numbers in the drawings are used to represent similar components, wherein.

DETAILED DESCRIPTION OF THE INVENTION

Figure 1:
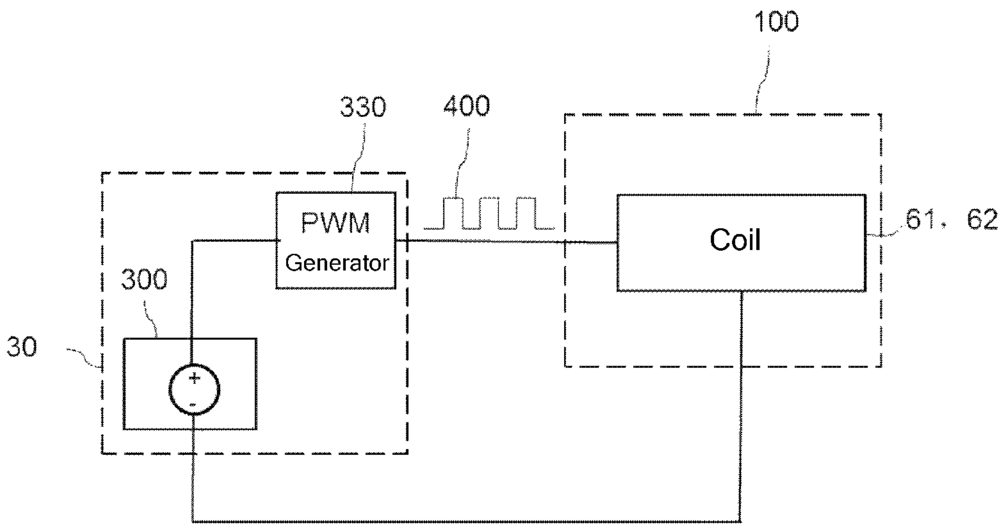
FIG. 1 is a schematic structural diagram of a brake device for an elevator system according to an embodiment of the present invention.

It will be readily understood that, based on the technical solutions of the present invention, those ordinary skilled in the art can propose a variety of alternative structure modes and implementations without altering the true spirit of the present invention. Therefore, the following detailed description and the accompanying drawings are merely exemplary description of the technical solutions of the present invention, which shall not be considered as the whole of the present invention or as limitation or restriction of the technical solutions of the present disclosure.

Orientation terms as upper, lower, left, right, front, rear, front side, back side, top, bottom or the like that are mentioned or may be mentioned in this description are defined with respect to the configurations shown in the individual drawings. They are relative concepts and thus possibly change according to their different positions and different usage states. Therefore, these or other orientation terms shall not be interpreted as limiting terms.

Some block diagrams shown in the figures are functional entities and do not necessarily have to correspond to physically or logically independent entities. The functional entities may be implemented in software or in one or more hardware modules or integrated circuits, or these functional entities may be implemented in different networks and/or processor devices and/or microcontroller devices.

The present invention is described below in terms of block diagram illustration, block diagrams and/or flowcharts of methods and devices according to embodiments of the present invention. It will be understood that each block of the flowchart illustrations and/or block diagrams, and combinations of the flowchart illustrations and/or block diagrams can be implemented by computer program instructions. These computer program instructions can be provided to a processor of a general purpose computer, special-purpose computer or other programmable data processing device to form a machine, such that these instructions, executed by a processor of a computer or other programmable data processing device, create components for implementing the flowcharts and/or blocks and/or the functions/operations specified in one or more flowchart block diagrams.

These computer program instructions may be stored in a computer readable memory, which may instruct a computer or other programmable processor to achieve functions in a specific manner such that these instructions stored in the computer readable memory constitute a product containing instruction components for implementing the functions/operations specified in one or more blocks of the flowcharts and/or block diagrams.

These computer program instructions may be loaded onto a computer or other programmable data processor to cause a series of operational steps to be executed on a computer or other programmable processor, so as to constitute a computer-implemented process to cause the instructions executed on a computer or other programmable data processor to provide steps for implementing functions or operations specified in one or more blocks of the flowcharts and/or block diagrams. It should also be noted that, in some alternative implementations, the functions/operations shown in the blocks may occur out of the order shown in the flowcharts. For example, two blocks shown in succession may, in fact, be performed substantially concurrently or these blocks may sometimes be performed in the reverse order, depending specifically upon the functions/operations involved.

The brake device of the embodiment shown in FIG. 1 may be applied in an elevator system of one embodiment of the present invention, the elevator system drives an elevator car through a traction device to travel in a hoistway, the brake device of the embodiment shown in FIG. 1 is disposed corresponding to a braking member 3 (e.g., a brake disc or a brake wheel) of the traction device, the brake device may be used to provide braking force to the braking member 3 to achieve the braking function of the elevator system. The brake device of one embodiment of the present invention includes a brake 100, the action of which is controlled by the controller 30 of the brake device.

Figure 2:
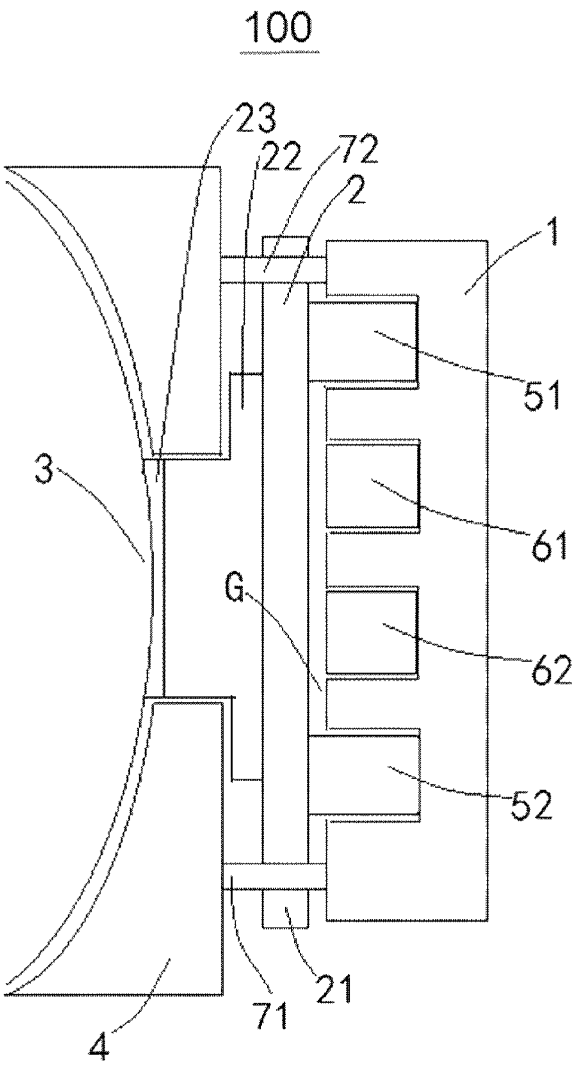
FIG. 2 shows a schematic diagram of a moving member of a brake device in a braking state according to an embodiment of the present invention.
Figure 3:
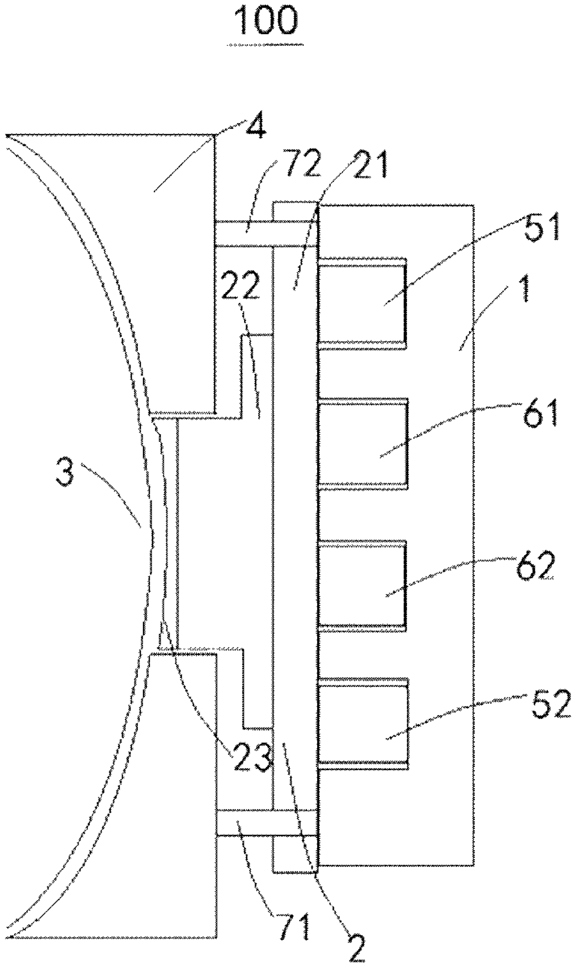
FIG. 3 shows a schematic diagram of a moving member of a brake device in an attracting state according to an embodiment of the present invention.

Referring to FIGS. 2 and 3, a schematic diagram of a moving member 2 of the brake device for an elevator system according to one embodiment of the present disclosure is shown in a braking state and an attracting state respectively. The brake 100 used by the brake device mainly includes: a fixed member 1, a moving member 2 and a braking member 3. The fixed member 1 is for example fixedly installed in a machine room, and the moving member 2 may include a body plate 21, a friction plate holder 22 and a friction plate 23. The moving member 2 is movable between a braking position shown in FIG. 2 and a retracted position shown in FIG. 3, for example, in the illustrated embodiment, a movement of the moving member 2 is guided to move by pins 71 and 72, so that the moving member 2 switches between a braking state and an attracting state correspondingly.

In the braking position, the friction plate 23 of the moving member 2 is in contact with the braking member 3 and provides a braking force to the braking member 3, the braking member 3 may for example be a wheel or a disc, which may be directly or indirectly connected to a traction machine that provides power to the elevator system, the moving member 2 is engaged with the braking member 3 and provides a braking force by friction, thereby stopping the running of the elevator car of the elevator system. Moreover, it is to be noted that in this braking state, there is a certain gap G between the moving member 2 and the fixed member 1, which is hereinafter referred to as air gap G. It is to be noted that with the use of the elevator brake device, the friction plate 23 may be gradually worn, and therefore the air gap G may gradually increase.

When the moving member 2 is in the retracted position shown in FIG. 3, the moving member 2 is close to the fixed member 1 and separated from the braking member 3, so that the braking member 3 is released to allow the movement or travelling of the elevator car. In one embodiment, take the brake 100 as a normally closed brake device as an example, wherein elastic members 51 and 52 are disposed between the moving member 2 and the fixed member 1, and specifically the elastic members 51, 52 may be springs, which are compressed when the moving member 2 is in the retracted position, thereby may producing an elastic force $F_{spring}$ tending to push the moving member 2 toward the braking position. Due to the action of elastic force $F_{spring}$ of the elastic members 51 and 52, the brake 100 of the brake device will also act to brake when the elevator system is unexpectedly de-energized.

In addition, in the brake 100 are also disposed coils 61 and 62 which, when energized, can produce an electromagnetic force $F_{magnet}$ tending to drive the moving member 3 to a retracted position, under that electromagnetic force $F_{magnet}$, the fixed member 1 can attract the moving member 2 to move toward the retracted position, thereby make the moving member 3 or the brake 100 tend to get to the attracting state.

It will be appreciated that the direction of the elastic force $F_{spring}$ and the electromagnetic force $F_{magnet}$ is substantially opposite. When the magnitude of the electromagnetic force $F_{magnet}$ is greater than the elastic force $F_{spring}$, the moving member 2 will be driven to tend to move toward the retracted position. When the magnitude of the electromagnetic force $F_{magnet}$ is smaller than the elastic force $F_{spring}$, the moving member 2 will be pushed to tend to move toward the braking position by the elastic members 51 and 52. Therefore, by controlling the magnitude of the electromagnetic force $F_{magnet}$, the moving member 3 can be controlled by the brake device to move between the retracted position and the braking position such that the moving member 2 or the brake 100 are enabled to switch between the attracting state and the braking state, respectively. By way of example, when the brake device is de-energized, the electromagnetic force $F_{magnet}$ is zero, the moving member 3 is pushed to the braking position, the moving member 2 or the brake 100 are correspondingly in the braking state, and the entire brake device produces a braking action. When the coils 61 and 62 of the brake device are energized, the electromagnetic force $F_{magnet}$ is sufficiently greater than $F_{spring}$, the moving member 3 is attracted to the retracted position, the moving member 2 or the brake 100 are correspondingly in the attracting state, and the entire brake device does not produce a braking action at this time.

The specific magnitude of the electromagnetic force $F_{magnet}$ may be controlled by the controller 30, which may, for example, control the electromagnetic force $F_{magnet}$ generated by the coils 61 and 62 to drive the moving member 2 to move to the retracted position by controlling the electrical signal 400 applied to coils 61 and 62. The electrical signal 400 may be represented as a voltage signal, and the magnitude of the voltage of the voltage signal may correspondingly control the magnitude of the current flowing through the coils 61 and 62, thereby controlling the magnitude of the electromagnetic force $F_{magnet}$. It will be appreciated that in other alternative embodiments, the electrical signal may also be directly represented as a current signal.

The brake device of an embodiment of the present invention may enable automatic testing of the elastic force $F_{spring}$ of the elastic members 51 and 52, wherein the controller 30 is configured to control the change of the magnitude of the electromagnetic force $F_{magnet}$ generated by the coils 61 and 62 during the testing of the elastic force $F_{spring}$ of the elastic members 51 and 52, and to acquire information of the corresponding electrical signal 400 for controlling the magnitude of the electromagnetic force $F_{magnet}$ when the moving member 3 switching from the attracting state to the braking state, so that the elastic force $F_{spring}$ being tested may be evaluated based on the information (e.g., the equivalent voltage magnitude) of the acquired electrical signal 400, further the performance degradation and the like of the elastic members 51 and 52 may be monitored. Moreover, the performance degradation of the elastic members 51 and 52 can be effectively and accurately tested automatically without relying on manual implementation.

Continuing as shown in FIG. 1, in one embodiment, the electrical signal 400 is specifically represented as Pulse Width Modulation (PWM) voltage signal, and the equivalent voltage magnitude of the PWM voltage signal 400 may be determined by its duty cycle. With the magnitude of the "HIGH" voltage stays constant, the greater the duty cycle, the greater the equivalent voltage of the PWM voltage signal 400, i.e., the greater the voltage applied to the coils 61 and 62, and the greater the produced electromagnetic force $F_{magnet}$. Therefore, the magnitude of the duty cycle of the PWM voltage signal 400 may correspond to the magnitude of the electromagnetic force $F_{magnet}$ to a certain degree, such correspondence may be obtained by determining and testing in advance. The information of the electrical signal 400 that the controller 30 may acquire may include voltage magnitude information corresponding to the duty cycle of the PWM voltage signal 400.

To generate PWM voltage signal 400 with controllable duty cycle, in the controller 30 or corresponding to the controller 30 is disposed a PWM generator 330. The control section 300 of the controller 30 may output a control signal to control the PWM generator 330, based on which the PWM generator 330 may generate the PWM voltage signal 400 of the corresponding magnitude of the duty cycle, so that the equivalent voltage magnitude of the PWM voltage signal 400 may be controlled, which in turn may control the magnitude of the electromagnetic force $F_{magnet}$ produced by the coils 61 and 62. By way of example, the control section 300 may control the PWM generator 330 to output a PWM voltage signal 400 of an equivalent voltage magnitude of 100V, 900V based on the power supply signal of 200V. It will be appreciated that, optionally, change of the equivalent voltage magnitude of the output PWM voltage signal 400 may be controlled to experience a continuous change by a continuous change of the duty cycle of the PWM voltage signal 400.

Figure 4:
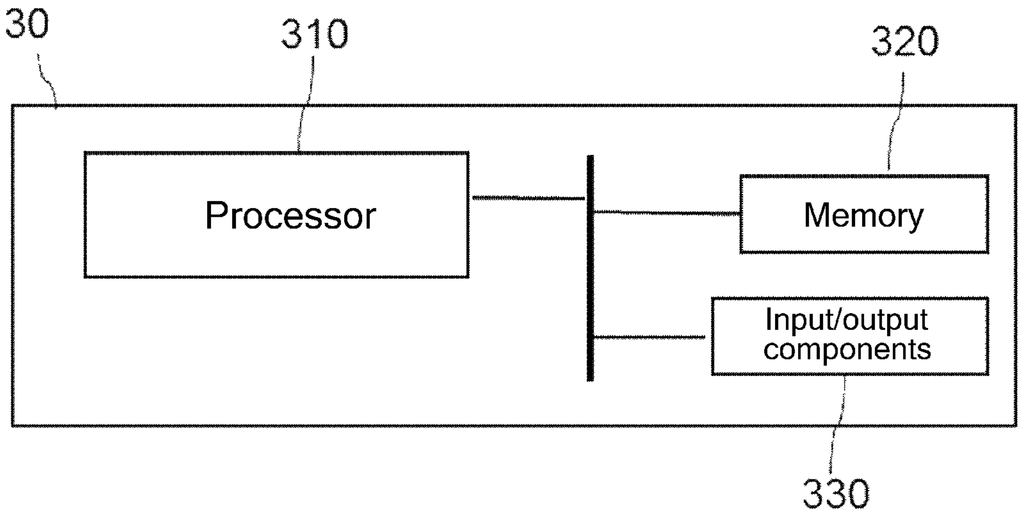
FIG. 4 is a schematic structural diagram of a basic hardware inside a controller of a brake device according to an embodiment of the present invention.

In one embodiment, as shown in FIG. 4, the controller 30 is internally disposed with a processor 310 and a memory 320. The memory 320 may store program code that may be read by the processor 310 and executed on the processor 310 to cause the brake device to perform operations defined by the program code. For example, the processor 310 may be used to perform all or some of the operations described below of the testing methods of the elastic members 51, 52.

The processor 310 and memory 320 within the controller 30 may communicate over a bus, for example. Corresponding input/output (I/O) components 330 may also be disposed on the corresponding bus. They may, for example, input a first correspondence, a second correspondence, a calibration value and the like described below. They can also be used to output a notification of maintenance or replacement of the elastic member as described below, and may also facilitate users to input respective instructions or other information.

While controller 30 has been shown with several components, it should be understood that the controller 30 may also include other components. The controller 30 may be implemented by a microcontroller, computer device, or the like.

Figure 5:
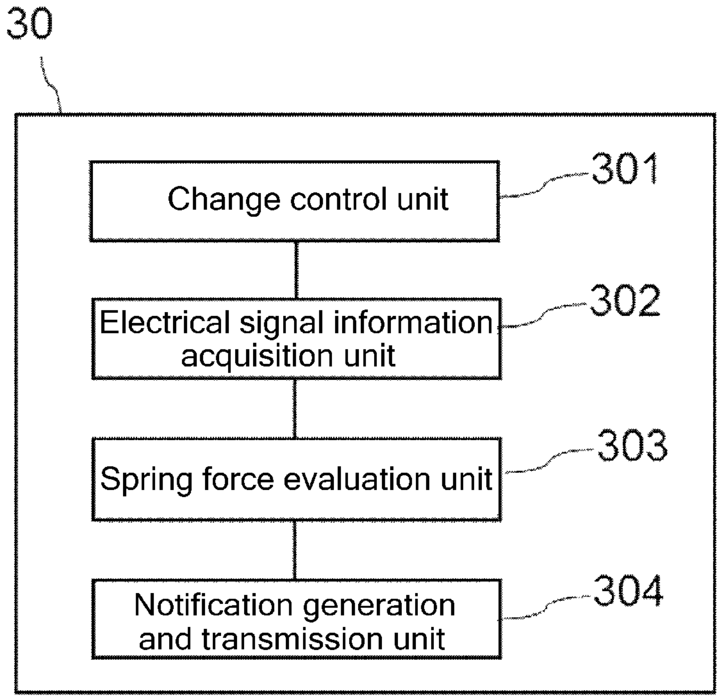
FIG. 5 is a schematic diagram of a module structure of a controller of a brake device according to an embodiment of the present invention.

In one embodiment, as shown in FIG. 5, the controller 30 or the control section 300 includes a change control unit 301, an electrical signal information acquisition unit 302, a spring force evaluation unit 303, and optionally may further include a notification generation and transmission unit 304.

Wherein the change control unit 301 may control change of the magnitude of the electromagnetic force $F_{magnet}$ produced by the coils 61 and 62 of the brake device when they are energized. For example, by controlling a continuous change of the duty cycle of the output PWM voltage signal 400, the equivalent voltage magnitude of the PWM voltage signal 400 is controlled to experience a continuous change from high to low within a predetermined range, such that the magnitude of the electromagnetic force $F_{magnet}$ changes from large to small within a respective predetermined range. When the electromagnetic force $F_{magnet}$ changes from large to small within the respective predetermined range, it may go across the spring force $F_{spring}$ being detected provided by the elastic members 51 and 52 when the corresponding moving member 2 is in the retracted position. Thus, the moving member 2 of the brake device will experience a switching operation from the attracting state to the braking state.

Wherein the electrical signal information acquisition unit 302 can acquire information of the corresponding electrical signal 400 (e.g., voltage magnitude information, duty cycle information, and the like) for controlling the magnitude of the electromagnetic force $F_{magnet}$ when the moving member 2 of the brake device switches from the attracting state to the braking state. It will be understood that the specific form or content of this information is not limiting and may include various forms of information reflecting the magnitude of the electromagnetic force $F_{magnet}$. The information of the electrical signal 400 acquired by the electrical signal information acquisition unit 302 may be recorded, for example, in a memory 320 as shown in FIG. 4.

Wherein the spring force evaluation unit 303 can evaluate the spring force $F_{spring}$ (e.g., evaluate or determine the magnitude of the spring force $F_{spring}$) provided by the elastic members 51 and 52 of the brake device disposed between the moving member 2 and the fixed member 1 based on the information of the electrical signal 400 acquired by the electrical signal information acquisition unit 302, so that the degree of performance degradation of the monitored elastic members 51 and 52 can be accurately known.

Figure 6:
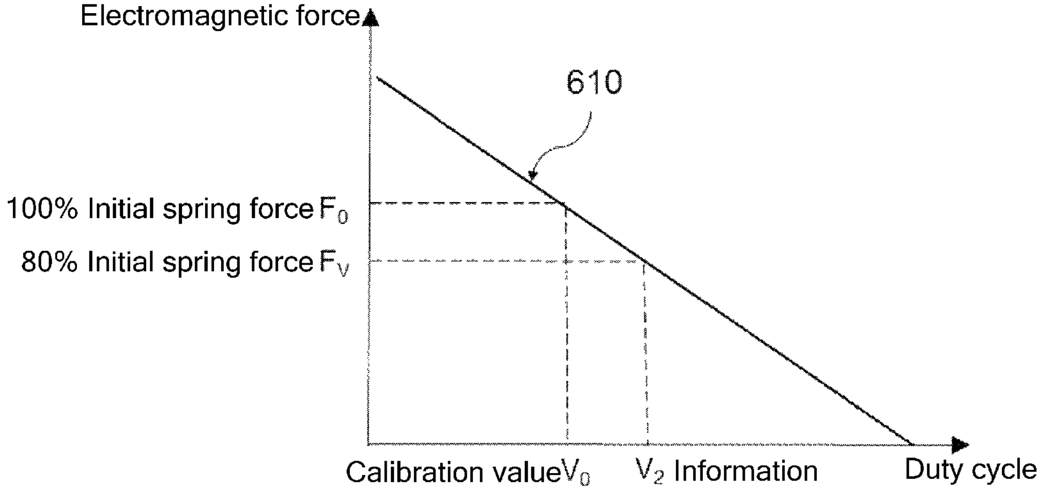
FIG. 6 is a schematic diagram of a first correspondence between the information of the electrical signal used by the brake device and the electromagnetic force produced by the coil according to an embodiment of the invention, wherein the second correspondence between the information of the electrical signal and the elastic force of the elastic member is also reflected.

In one embodiment, the first correspondence between the information of the electrical signal and the electromagnetic force $F_{magnet}$ used by the spring force evaluation unit 303 as reflected in FIG. 6 may be stored in the memory 320 as shown in FIG. 4, for example. As shown in FIG. 6, with the electrical signal being the PWM voltage signal 400 as an example, the abscissa represents the duty cycle of the PWM voltage signal 400, which also reflects the equivalent voltage magnitude of the PWM voltage signal 400, and the ordinate may represent the electromagnetic force $F_{magnet}$. For the convenience of illustration, an exemplary illustration is made given that the electromagnetic force $F_{magnet}$ changes linearly with the duty cycle of the PWM voltage signal 400. The brake device (e.g., a factory-fresh brake device) in the normal state can be tested in advance to obtain a corresponding electromagnetic force $F_{magnet}$ at different duty cycles, so that a first correspondence between the duty cycle of the electrical signal 400 and the electromagnetic force $F_{magnet}$, i.e., curve 610, may be generated or fitted. It will be appreciated that the curve 610 may also be pre-configured in the memory 320 of the controller 30 before leaving factory. Further, the controller 30 may also store a second correspondence (such as the correspondence of "calibration value $V_0$—100% initial spring force $F_0$" shown in FIG. 6, the correspondence of "information $V_2$—80% initial spring force $F_v$") between information (e.g., duty cycle or voltage magnitude) of the electrical signal 400 and the spring force $F_{spring}$ of the elastic members 51 and 52 in the memory 320.

For the calibration value $V_0$ (e.g., the duty cycle information obtained by the electrical signal information acquisition unit 302) of the corresponding electrical signal 400 when the moving member switches from the attracting state to the braking state obtained by testing before the performance degradation of elastic members 51 and 52 (for example in the factory state), the second correspondence between the calibration value $V_0$ and the initial spring force $F_0$ of the elastic members 51 and 52 can be labeled in FIG. 6. Wherein the initial spring force $F_0$ of the elastic members 51 and 52 may be obtained based on the first correspondence and the calibration value $V_0$, for example, a respective electromagnetic force is obtained from the curve 610 based on the calibration value $V_0$, the magnitude of this electromagnetic force is 100% initial spring force $F_0$. Of course, information $V_2$ (such as the duty cycle information obtained by the electrical signal information acquisition unit 302) of the corresponding electrical signal 400 when the moving member 2 switches from the attracting state to the braking state obtained by testing after the performance degradation of the plurality of identical brake devices (e.g., during operation of the elevator) may be measured. And the corresponding electromagnetic force $F_{magnet}$ that causes the switching to occur is measured, this electromagnetic force $F_{magnet}$ is representative of the spring force applied by the elastic members 51 and 52 at the retracted position, which is specifically expressed in the form of a percentage relative to the initial spring force $F_0$. Based on the data measured several times in advance, for example, a second correspondence between the information $V_2$ and 80% initial spring force $F_0$ of the elastic members 51 and 52 may be labeled in FIG. 6. It will be appreciated that the correspondence of more points may also be labeled in FIG. 6 as needed, to more fully fit the second correspondence between the information of the electrical signal used by the spring force evaluation unit 303 and the spring force $F_{spring}$ of the elastic members 51 and 52.

The spring force evaluation unit 303 may further determine the magnitude and/or change of the spring force $F_{spring}$ being tested based on information (e.g., duty cycle information) of the electrical signal 400 acquired by the electrical signal information acquisition unit 302 and the correspondence as shown in FIG. 6. By way of example, comparing the information of the currently acquired electrical signal 400 (e.g., the equivalent voltage magnitude of the duty cycle information) on the occurrence of switching and the calibration value $V_0$ to evaluate the degree of performance degradation of the spring force of the elastic members 51 and 52. For example, when the difference between the currently acquired equivalent voltage magnitude of the electrical signal 400 on the occurrence of switching and the calibration value $V_0$ (i.e., the degree of change of the relative calibration value $V_0$ of the information of the acquired electrical signal) is greater than or equal to $(V_2-V_0)$, the spring force evaluation unit 303 can make accurate evaluation that the elastic members 51 and 52 have degraded to a condition requiring maintenance or replacement thereof.

It should be noted that, from the correspondence shown in FIG. 6, the magnitude of the spring force $F_{spring}$ corresponding to the information of the currently acquired electrical signal 400 on the occurrence of the switching may be looked up or calculated, and therefore, the comparison between the information (e.g., the equivalent voltage magnitude of the duty cycle information) of the currently acquired electrical signal 400 on the occurrence of switching and the calibration value $V_0$ may also be represented as a direct comparison between the currently acquired spring force $F_{spring}$ and the initial spring force $F_0$. Also, when the magnitude of the difference between the initial spring force $F_0$ and the currently acquired spring force $F_{spring}$ is greater than or equal to $(F_0-F_v)$, the spring force evaluation unit 303 can accurately evaluate and determine that the elastic members 51 and 52 have degraded to a condition requiring maintenance or replacement thereof.

Continuing as shown in FIG. 5, the notification generation and transmission unit 304 may transmit a notification of maintenance or replacement of the elastic members 51 and 52 based on the evaluated determination result of the spring force evaluation unit 303. For example, when it is determined that the elastic members 51 and 52 have degraded to a condition requiring maintenance or replacement thereof, notification of maintenance or replacement of the elastic members 51 and 52 is automatically issued to intelligently alert personnel to perform maintenance or replacement operation and the like of the elastic members 51 and 52, which is advantageous to ensure that the brake device works reliably or safely as much as possible, improving safety of the elevator passengers.

Figure 7:
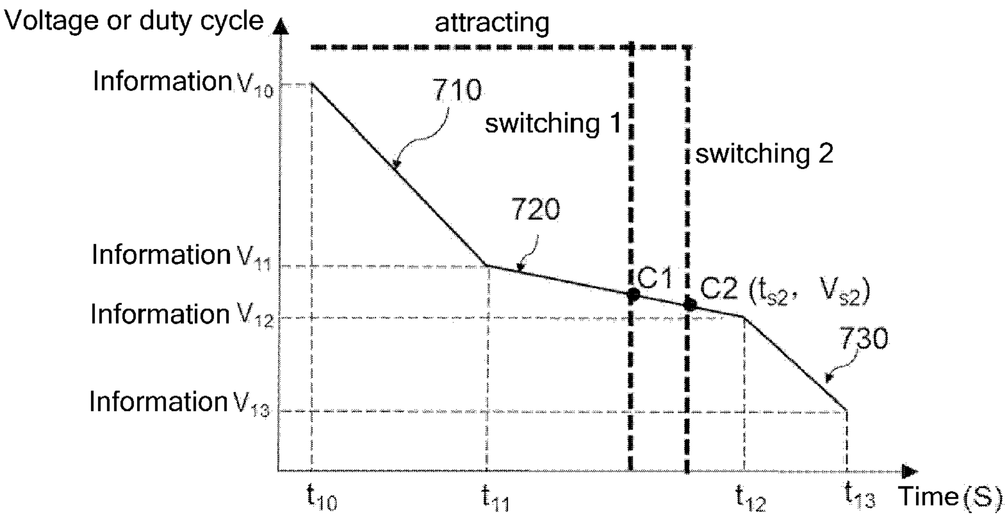
FIG. 7 is a schematic diagram of an elastic force testing principle of a brake device according to an embodiment of the present invention.

In one embodiment, as illustrated in FIG. 7, the change control unit 301 controls the change of the magnitude of the electromagnetic force $F_{magnet}$ produced by the coils 61 and 62 of the brake device when energized by controlling the voltage magnitude or duty cycle of the electrical signal 400. The voltage magnitude or duty cycle of the electrical signal 400 continuously biased on the coils 61 and 62 is controlled to decrease at a predetermined slope. By controlling the electrical signal 400 to decrease from high to low over time in the range of predetermined phases (e.g., $t_{10}$-$t_{13}$), the electromagnetic force $F_{magnet}$ produced when the coils 61 and 62 are energized changes from large to small under control. In order to facilitate the electrical signal information acquisition unit 302 to acquire the information of the corresponding electrical signal 400 on the occurrence of switching more accurately, the predetermined phase $t_{10}$-$t_{13}$ includes a first sub-phase $t_{10}$-$t_{11}$, a second sub-phase $t_{10}$-$t_{12}$ and a third sub-phase $t_{12}$-$t_{13}$ which are sequentially arranged in time sequence. By dividing into sub-phases, it is possible to substantially ensure that the switching of the moving member 2 from the attracting state to the braking state occurs in the second sub-phase (even if elastic members 51 and 52 degrade to different degrees). Wherein, for example, the decreasing speed of the duty cycle of the control electrical signal 400 in the second sub-phase $t_{10}$-$t_{12}$ is relatively slower than the decreasing speed in the first sub-phase $t_{10}$-$t_{11}$ and the third sub-phase $t_{12}$ to $t_{13}$. In this way, the coordinate information of points C1 and C2 respectively (i.e., C1 ($t_{s1}$, $V_{s1}$) and C2 ($t_{s2}$, $V_{s2}$), respectively) in FIG. 7 may be accurately acquired when the moving member 2 experiences, for example, switching 1 or switching 2 as shown in FIG. 7, which is advantageous to realize accurate obtaining of the evaluation result of the spring force. Moreover, the decreasing speed of the duty cycle in the first sub-phase $t_{10}$-$t_{11}$ and the third sub-phase $t_{12}$-$t_{13}$ is relatively faster, which is advantageous to control the rapid change of the voltage of the control signal 400 from V10 to V11, from $V_{12}$ to $V_{13}$, greatly improving the testing efficiency of braking.

The brake device of the above disclosed embodiments may enable automatic testing of one of the key elements in the brake device, i.e., the elastic members 51 and 52, and the testing may totally be performed during periods when the elevator system stops running, and the change of performance of the elastic members 51 and 52 during the using process can be accurately monitored, the implementation cost is low, which is advantageous to maintain the elastic members 51 and 52 can in time, so that the reliability of the elevator system and the safety of passengers are improved.

Figure 8:
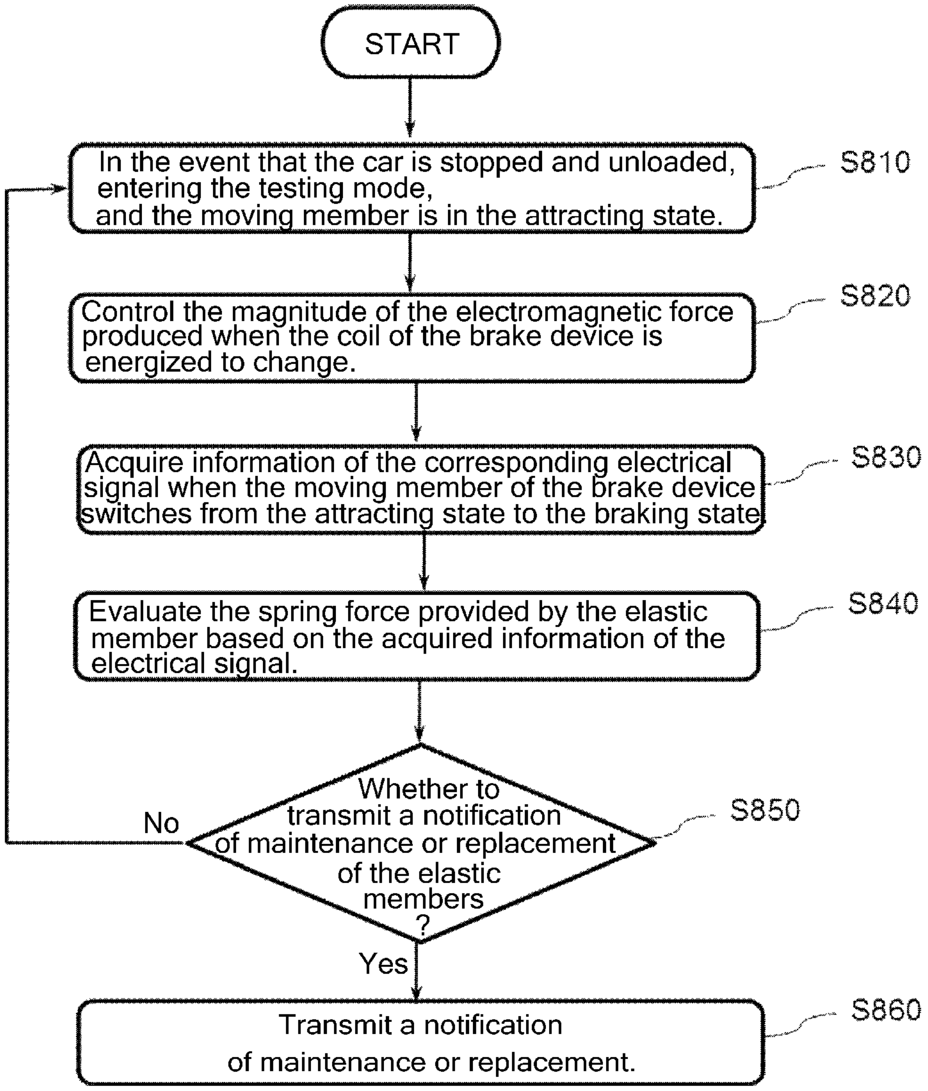
FIG. 8 is a flowchart of a testing method according to an embodiment of the invention.

A method for testing a brake device corresponding to the embodiment shown in FIG. 1 is further illustrated below in connection with FIG. 8. The testing method of the following embodiments may be automatically triggered by the controller 30 to perform tests, which may perform the testing method periodically. For example, the controller 30 may be configured to perform the testing method daily, weekly, or every other number of days. Of course, the testing method may also be performed at predetermined points in time, for example being automatically performed at the time period when the elevator has lower load (e.g., early in the morning).

First, for step S810, in the event that the car is stopped and unloaded, it is triggered to enter the testing mode, and the moving member 2 is in the attracting state. In this step, the controller 30 firstly confirms whether the elevator car is in a stopped and unloaded state when the predetermined testing time comes. If the elevator car is not stopped or unloaded, then the elevator car will not undertake new tasks after the current task is completed. If it stops directly at a predetermined floor unloaded then the testing mode is performed.

For step S820, control the magnitude of the electromagnetic force $F_{magnet}$ produced when the coil of the brake device is energized to change. This step S820 may be implemented specifically by the change control unit 301 described above, for example, the magnitude of the electromagnetic force $F_{magnet}$ may change under control in a voltage or duty cycle decreasing manner given by the example of FIG. 7. In the process of performing this change, the electromagnetic force $F_{magnet}$ may be gradually reduced to what is substantially equal to a spring force $F_{spring}$ produced by the elastic members 51 and 52 in the retracted position, so that switching of the moving member 2 from the attracting state to the braking state occurs at a certain time.

For Step S830, acquire information (e.g., voltage magnitude or duty cycle) of the corresponding electrical signal 400 for controlling the magnitude of the electromagnetic force $F_{magnet}$ when the moving member 2 of the brake device switches from the attracting state to the braking state. This step S830 may specifically be realized by the electrical signal information acquisition unit 302 described above, and it will be understood that the information of the electrical signal 400 may reflect the magnitude of the electromagnetic force $F_{magnet}$ when switching and the magnitude of the spring force $F_{spring}$ produced or provided in the retracted position.

For step S840, evaluate the spring force $F_{spring}$ provided by the elastic member of the brake device based on the acquired information of the electrical signal 400. This step S840 may specifically be realized by the spring force evaluation unit 303 described above and may use the correspondence as shown in FIG. 6 to determine the magnitude and/or change of the spring force $F_{spring}$ being tested, enabling more accurate and comprehensive evaluation of the elastic members 51 and 52.

For step S850, a determination is made whether to transmit a notification of maintenance or replacement of the elastic members 51 and 52 based on a change (e.g., a change of the relative calibration value $V_0$) in the information of the acquired electrical signal 400. Step S850 may also specifically be realized by the spring force evaluation unit 303 described above, the criterion used in the determination process may also be predefined or configured in the controller 30. As such, the degradation of the performance of the elastic members 51 and 52 may be timely notified and the corresponding maintenance or replacement operation may be performed in time.

For step S860, a notification of maintenance or replacement of the elastic member is transmitted when determined as "yes". This step S860 may specifically be realized by the notification generation and transmission unit 3043 described above.

It is to be noted that the brake device and the testing method thereof of the above disclosed embodiments can be implemented without relying on for example a pressure sensor, so that the problems brought by installation, failure and the like of the sensor are avoided, and the cost can be greatly reduced.

The above examples mainly illustrate the brake device, a testing method thereof, and an elevator system using the brake device according to the present invention. While only some of the implementations of the present invention have been described, it will be understood by those of ordinary skill in the art that the present invention may be implemented in many other forms without departing from the substance and scope thereof. For example, information of the electrical signal 400 may be represented as other information that can reflect the magnitude of the current electromagnetic force $F_{magnet}$, for example current magnitude information, and the like. Accordingly, the illustrated examples and implementations are to be considered as illustrative and not restrictive, and the invention may encompass various modifications and substitutions without departing from the spirit and scope of the invention as defined by the appended claims.

What is claimed is:

1. A brake device for an elevator system, comprising:

a fixed member;

a moving member that is movable between a retracted position and a braking position so as to realize switching of the moving member between an attracting state and a braking state, respectively;

an elastic member, disposed between the moving member and the fixed member, for providing a spring force tending to push the moving member toward the braking position;

a coil configured to produce an electromagnetic force tending to drive the moving member to move toward the retracted position when energized; and a controller configured to control a magnitude of the electromagnetic force produced by the coil to change in a process of testing the spring force of the elastic member, and to acquire information of the corresponding electrical signal for controlling the magnitude of the electromagnetic force when the moving member switches from the attracting state to the braking state so as to evaluate the spring force being tested;

wherein the electrical signal is represented as a pulse width modulation voltage signal, the information of the electrical signal including voltage magnitude information corresponding to a duty cycle of the pulse width modulation voltage signal.

2. The brake device of claim 1, wherein when the moving member is in the retracted position, the moving member is separate from the braking member and is in the attracting state in which the moving member is attracted to the fixed member, when the moving member is in the braking position, the moving member is in the braking state in which braking force is provided to the braking member through a friction plate correspondingly disposed on the moving member.

3. The brake device of claim 1, wherein the controller is further configured to store a first correspondence between the information of the electrical signal and the electromagnetic force produced by the coil.

4. The brake device of claim 3, wherein the controller is further configured to further determine a magnitude and/or a change of the spring force being tested based on the acquired information of the electrical signal and the first correspondence.

5. The brake device of claim 3, wherein the controller is further configured to store a second correspondence between the information of the electrical signal and the spring force of the elastic member, wherein, the second correspondence comprises a correspondence between a calibration value of a corresponding electrical signal when the moving member switches from the attracting state to the braking state obtained by testing before a performance degradation of the elastic member and an initial spring force of the elastic member, the initial spring force of the elastic member is obtained based on the first correspondence and the calibration value.

6. The brake device of claim 5, wherein the controller is further configured to evaluate a degree of the performance degradation of the spring force according to a comparison between the currently acquired information of the electrical signal and the calibration value.

7. The brake device of claim 1, wherein the controller is further configured to control the electromagnetic force produced by the coil to change from large to small by controlling the electrical signal to decrease over time from high to low in a range of a predetermined phase.

8. The brake device of claim 7, wherein the predetermined phase comprises a first sub-phase, a second sub-phase and a third sub-phase sequentially arranged in time sequence;

wherein the controller is further configured to control a decreasing speed of the electrical signal in the second sub-phase to be relatively lower than the decreasing speed in the first sub-phase and third sub-phase and to substantially ensure that the information of the corresponding electrical signal when the moving member switches from the attracting state to the braking state is acquired in the second sub-phase.

9. The brake device of claim 1, wherein the controller is further configured to determine whether to transmit a notification of maintenance or replacement of the elastic member based on the change of the acquired information of the electrical signal.

10. An elevator system comprising:

an elevator car, and a traction device driving the elevator car to travel in a hoistway;

wherein the elevator system further comprises a brake device according to claim 1 disposed corresponding to the braking member of the traction device.

11. A testing method for a brake device, comprising:

controlling a magnitude of an electromagnetic force produced by a coil of the brake device when energized to change;

acquiring information of a corresponding electrical signal for controlling the magnitude of the electromagnetic force when a moving member of the brake device switches from an attracting state to a braking state; and evaluating a spring force provided by an elastic member of the brake device disposed between the moving member and the fixed member based on the acquired information of the electrical signal;

wherein the moving member is movable between an attracting position and a braking position so as to realize switching of the moving member between the attracting state and the braking state, respectively; the spring force provided by the elastic member tends to push the moving member toward the braking position, the electromagnetic force tends to drive the moving member to move toward the retracted position;

wherein the electrical signal is represented as a pulse width modulation voltage signal, the information of the electrical signal including voltage magnitude information corresponding to a duty cycle of the pulse width modulation voltage signal.

12. The testing method of claim 11, wherein the evaluating the spring force provided by the elastic member, the magnitude and/or change of the spring force being tested is determined based on the acquired information of the electrical signal and a first correspondence between the previously acquired information of the electrical signal and the electromagnetic force produced by the coil.

13. The testing method of claim 11, wherein the second correspondence between the information of the electrical signal and the spring force of the elastic member is obtained based on the first correspondence; wherein the second correspondence comprises the correspondence between a calibration value of the corresponding electrical signal when the moving member switches from the attracting state to the braking state obtained by testing before a performance degradation of the elastic member and an initial spring force of the elastic member, the initial spring force of the elastic member is obtained based on the first correspondence and the calibration value.

14. The testing method of claim 13, wherein the evaluating the spring force provided by the elastic member, a degree of the performance degradation of the spring force is evaluated according to a comparison between the currently acquired information of the electrical signal and the calibration value.

15. The testing method of claim 11, wherein in the process of controlling the magnitude of the electromagnetic force produced by the coil of the brake device when energized to change, the electromagnetic force produced by the coil when energized is controlled to change from large to small by controlling the electrical signal to decrease over time from high to low in a range of a predetermined phase.

16. The testing method of claim 15, wherein the predetermined phase comprises a first sub-phase, a second sub-phase and a third sub-phase sequentially arranged in time sequence;

wherein the method comprising controlling a decreasing speed of the electrical signal in the second sub-phase to be relatively lower than the decreasing speed in the first sub-phase and third sub-phase and substantially ensuring that the information of the corresponding electrical signal when the moving member switches from the attracting state to the braking state is acquired in the second sub-phase.

17. The testing method of claim 11, further comprising:

determining whether to transmit a notification of maintenance or replacement of the elastic member based on the change of the acquired information of the electrical signal; and transmitting a notification of maintenance or replacement of the elastic member when determined as "yes".

18. The testing method of claim 10, wherein the electrical signal is a voltage signal and the information of the electrical signal comprises a voltage magnitude.

* * * * *